US011042893B1

(12) United States Patent
Lovett et al.

(10) Patent No.: US 11,042,893 B1
(45) Date of Patent: Jun. 22, 2021

(54) SYSTEM FOR PROCESSING A DIGITAL PROMOTION BASED UPON GEOGRAPHIC DESTINATION DETERMINED FROM A RIDE-SHARING APPLICATION AND RELATED METHODS

(71) Applicant: INMAR CLEARING, INC., Winston-Salem, NC (US)

(72) Inventors: Lee Lovett, Springfield, PA (US); Nathanael Georgeson, Seattle, WA (US); Ryan Halper, New York, NY (US); Samuel May, Kent, WA (US); O'Ryan McEntire, Seattle, WA (US); Zackary Smith, Seattle, WA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 159 days.

(21) Appl. No.: 16/180,679

(22) Filed: Nov. 5, 2018

(51) Int. Cl.
  *G06Q 30/00* (2012.01)
  *G06Q 30/02* (2012.01)
  *G06F 16/29* (2019.01)
  *G06F 16/9537* (2019.01)

(52) U.S. Cl.
  CPC ......... *G06Q 30/0236* (2013.01); *G06F 16/29* (2019.01); *G06F 16/9537* (2019.01); *G06Q 30/0235* (2013.01); *G06Q 30/0238* (2013.01); *G06Q 30/0261* (2013.01); *G06Q 30/0265* (2013.01); *G06Q 30/0267* (2013.01)

(58) Field of Classification Search
  CPC ............ G06Q 30/0236; G06Q 30/0238; G06F 16/29; G06F 16/9537
  See application file for complete search history.

(56) References Cited

U.S. PATENT DOCUMENTS

| 6,154,745 A | * | 11/2000 | Kari | ........................ | H04W 4/02 705/1.1 |
| 6,202,023 B1 | * | 3/2001 | Hancock | ................ | G01C 21/26 701/516 |

(Continued)

OTHER PUBLICATIONS

"Solving Fraudulent Redemption: A Simple Solution for Coupons, Daily Deals, and Other Promotions." First Data Market Insight, First Data Corporation, 2012. (Year: 2012).*

*Primary Examiner* — Luis A Brown
(74) *Attorney, Agent, or Firm* — Allen, Dyer, Doppelt, + Gilchrist, P.A. Attorneys at Law

(57) ABSTRACT

A system for processing a digital promotion may include a mobile wireless communications device associated with a user and configured to operate a ride-sharing application and a digital promotion server. The digital promotion server may be configured to determine a geographic destination of the user based upon the ride-sharing application and generate a digital promotion for redemption at a redemption location associated with the geographic destination and communicate the digital promotion to the mobile wireless communications device. The digital promotions server may also be configured to cooperate with the mobile wireless communications device to prompt the user to accept the digital promotion, and upon acceptance, generate a user identifier associated with the user and the digital promotion and communicate the user identifier to the redemption location for redemption of the digital promotion.

16 Claims, 4 Drawing Sheets

(56) References Cited

U.S. PATENT DOCUMENTS

| | | | | |
|---|---|---|---|---|
| 6,219,614 B1* | 4/2001 | Uchigaki | G01C 21/3632 | 701/428 |
| 6,252,544 B1* | 6/2001 | Hoffberg | H04B 7/18576 | 342/357.31 |
| 6,253,069 B1* | 6/2001 | Mankovitz | H04N 7/002 | 455/186.1 |
| 6,332,127 B1* | 12/2001 | Bandera | G06Q 30/02 | 705/14.55 |
| 6,353,398 B1* | 3/2002 | Amin | G06Q 30/0255 | 340/531 |
| 6,360,167 B1* | 3/2002 | Millington | G01C 21/26 | 342/357.31 |
| 6,381,603 B1* | 4/2002 | Chan | G06F 16/9537 | 707/724 |
| 6,421,675 B1* | 7/2002 | Ryan | G06Q 30/08 | |
| 6,429,813 B2* | 8/2002 | Feigen | G01C 21/3617 | 701/414 |
| 6,571,279 B1* | 5/2003 | Herz | G06Q 30/02 | 709/217 |
| 6,647,257 B2* | 11/2003 | Owensby | H04M 3/42348 | 455/414.1 |
| 6,647,414 B1* | 11/2003 | Eriksson | G06Q 30/0277 | 705/14.73 |
| 6,741,188 B1* | 5/2004 | Miller | G06Q 30/0255 | 340/539.13 |
| 7,136,875 B2* | 11/2006 | Anderson | G06Q 30/02 | |
| 7,246,109 B1* | 7/2007 | Ramaswamy | G06F 16/9537 | |
| 7,561,169 B2* | 7/2009 | Carroll | G06T 17/05 | 345/619 |
| 8,521,131 B1* | 8/2013 | Ramalingam | G06Q 30/0259 | 455/410 |
| 8,719,094 B1* | 5/2014 | Klein | G06Q 30/0255 | 705/14.53 |
| 8,777,754 B1* | 7/2014 | Santini | G07F 17/3255 | 463/42 |
| 9,648,056 B1* | 5/2017 | Kim | G06Q 30/0261 | |
| 10,057,115 B2* | 8/2018 | Baca | H04L 67/18 | |
| 10,395,269 B2* | 8/2019 | Catania | G06Q 20/3829 | |
| 10,467,648 B1* | 11/2019 | Walker | G06Q 20/204 | |
| 10,521,815 B1* | 12/2019 | Joseph | G06Q 30/0235 | |
| 10,755,297 B1* | 8/2020 | Smith | G06Q 30/0225 | |
| 10,891,643 B1* | 1/2021 | Georgeson | H04L 51/02 | |
| 2002/0046084 A1* | 4/2002 | Steele | H04L 65/4076 | 705/14.64 |
| 2002/0095333 A1* | 7/2002 | Jokinen | G06Q 30/0207 | 705/14.26 |
| 2002/0103892 A1* | 8/2002 | Rieger, III | G06F 16/88 | 709/223 |
| 2002/0128903 A1* | 9/2002 | Kernahan | G06Q 30/02 | 705/14.22 |
| 2002/0164977 A1* | 11/2002 | Link, II | G06Q 30/0267 | 455/414.1 |
| 2003/0065595 A1* | 4/2003 | Anglum | G06Q 30/02 | 705/35 |
| 2004/0006425 A1* | 1/2004 | Wood | G09B 29/10 | 701/532 |
| 2004/0210386 A1* | 10/2004 | Wood | G01C 21/26 | 701/532 |
| 2004/0254723 A1* | 12/2004 | Tu | G01C 21/3679 | 701/410 |
| 2005/0209921 A1* | 9/2005 | Roberts | G06Q 30/02 | 705/14.13 |
| 2005/0261822 A1* | 11/2005 | Wako | G09B 29/007 | 701/438 |
| 2006/0238379 A1* | 10/2006 | Kimchi | G08B 1/0969 | 340/995.1 |
| 2007/0174259 A1* | 7/2007 | Amjadi | G06Q 30/02 | |
| 2008/0021637 A1* | 1/2008 | Staton | G08B 25/14 | 701/408 |
| 2008/0052186 A1* | 2/2008 | Walker | G06Q 30/02 | 705/26.1 |
| 2008/0153487 A1* | 6/2008 | Martin | H04W 4/02 | 455/435.1 |
| 2010/0070169 A1* | 3/2010 | Paulin | G01C 21/26 | 701/467 |
| 2010/0130226 A1* | 5/2010 | Arrasvuori | H04W 4/029 | 455/456.1 |
| 2010/0241496 A1* | 9/2010 | Gupta | H04L 67/20 | 705/14.1 |
| 2011/0125594 A1* | 5/2011 | Brown | G06Q 30/0241 | 705/14.73 |
| 2011/0191160 A1* | 8/2011 | Blackhurst | G06Q 20/20 | 705/14.38 |
| 2011/0276393 A1* | 11/2011 | Srinivasan | G06Q 30/0241 | 705/14.46 |
| 2012/0030048 A1* | 2/2012 | Manley | G06Q 20/02 | 705/26.1 |
| 2012/0088523 A1* | 4/2012 | Shirakawa | H04W 4/021 | 455/456.3 |
| 2012/0203604 A1* | 8/2012 | Baker | G06Q 30/0207 | 705/14.17 |
| 2012/0323657 A1* | 12/2012 | Tiku | G06Q 30/0261 | 705/14.17 |
| 2013/0275192 A1* | 10/2013 | Aissa | G06Q 30/0226 | 705/14.15 |
| 2013/0332860 A1* | 12/2013 | Jin | H04W 4/12 | 715/753 |
| 2014/0100945 A1* | 4/2014 | Kitts | G06Q 30/0243 | 705/14.42 |
| 2014/0129337 A1* | 5/2014 | Otremba | G06Q 30/0261 | 705/14.58 |
| 2014/0171099 A1* | 6/2014 | Sydir | H04W 4/029 | 455/456.1 |
| 2014/0199961 A1* | 7/2014 | Mohammed | H04W 4/60 | 455/406 |
| 2014/0201001 A1* | 7/2014 | Rellas | G06Q 30/0261 | 705/14.58 |
| 2014/0207604 A1* | 7/2014 | Morgan | G06Q 30/0611 | 705/26.4 |
| 2014/0358673 A1* | 12/2014 | Sim | G06Q 30/0273 | 705/14.45 |
| 2015/0032544 A1* | 1/2015 | Kim | G06Q 30/0267 | 705/14.58 |
| 2015/0120405 A1* | 4/2015 | Kavana | G06Q 30/0252 | 705/14.5 |
| 2015/0134432 A1* | 5/2015 | Lewis | G06Q 30/0222 | 705/14.13 |
| 2015/0204684 A1 | 7/2015 | Rostamian et al. | | |
| 2015/0278860 A1* | 10/2015 | Rayanchu | G06F 16/954 | 705/14.45 |
| 2015/0302456 A1* | 10/2015 | Rego | G06Q 30/0235 | 705/14.35 |
| 2016/0027056 A1* | 1/2016 | Taslimi | G06F 16/9537 | 705/14.45 |
| 2016/0155088 A1* | 6/2016 | Pylappan | G06Q 10/0836 | 705/333 |
| 2016/0188596 A1* | 6/2016 | Keggi | G06Q 30/0631 | 703/11 |
| 2017/0032416 A1* | 2/2017 | Soni | G06Q 30/0254 | |
| 2017/0034659 A1* | 2/2017 | Shnitzer | G06Q 50/01 | |
| 2017/0124586 A1* | 5/2017 | Tepper | G06Q 30/0225 | |
| 2017/0236235 A1* | 8/2017 | Frankert | G06Q 50/30 | 705/13 |
| 2018/0308121 A1* | 10/2018 | Jiang | H04L 67/40 | |
| 2018/0374126 A1* | 12/2018 | Patil | G07C 5/008 | |
| 2019/0266638 A1* | 8/2019 | Bastide | G06Q 30/0255 | |
| 2020/0005364 A1* | 1/2020 | Aznaurashvili | G06Q 30/0281 | |
| 2020/0065869 A1* | 2/2020 | Tiderington | G06Q 10/02 | |

\* cited by examiner

SYSTEM FOR PROCESSING A DIGITAL PROMOTION BASED UPON GEOGRAPHIC DESTINATION DETERMINED FROM A RIDE-SHARING APPLICATION AND RELATED METHODS

TECHNICAL FIELD

The present invention relates to the field of electronics, and more particularly, to ride-sharing application based digital promotion generation and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

A ride-sharing application generally permits a user to request a ride, for example, using an associated mobile wireless communications device. The ride-sharing application connects the user to a driver, who typically drives their private vehicle and operates the ride-sharing application on their respective mobile wireless communications device, based upon respective geographic locations. Payment for the ride is typically handled through the ride-sharing application. Information about a requested ride, location and information about a driver or potential driver, and pricing information are displayed on a display of the mobile wireless communications device.

SUMMARY

A system for processing a digital promotion may include a mobile wireless communications device associated with a user and configured to operate a ride-sharing application and a digital promotion server. The digital promotion server may be configured to determine a geographic destination of the user based upon the ride-sharing application and generate a digital promotion for redemption at a redemption located associated with the geographic destination and communicate the digital promotion to the mobile wireless communications device. The digital promotions server may also be configured to cooperate with the mobile wireless communications device to prompt the user to accept the digital promotion, and upon acceptance, generate a user identifier associated with the user and the digital promotion and communicate the user identifier to the redemption location for redemption of the digital promotion.

The digital promotion server may be configured to communicate the digital promotion to the mobile wireless communications device for display within the ride-sharing application, for example. The system may further include a point-of-sale (POS) terminal at the redemption location, and the digital promotion server may be configured to communicate the user identifier to the POS terminal. The POS terminal may be configured to obtain a user-provided identifier from the user and cooperate with the digital promotion server to redeem the digital promotion based upon a match between the user-provided identifier and the user identifier, for example.

The redemption location may be within a threshold distance from the geographic destination. The digital promotion may be redeemable toward a product/service at the redemption location, for example.

The digital promotion may have a redemption value associated therewith equal to a purchase price of the product/service, for example. The digital promotion server may be configured to communicate the digital promotion as a short-messaging-service (SMS) message.

A method aspect is directed to method of processing a digital promotion. The method may include using a processor and an associated memory to determine a geographic destination of the user based upon a ride-sharing application operated by a mobile wireless communications device associated with a user. The method may also include using the processor to generate a digital promotion for redemption at a redemption location associated with the geographic destination and communicate the digital promotion to the mobile wireless communications device. The method may further include using the processor to cooperate with the mobile wireless communications device to prompt the user to accept the digital promotion, and upon acceptance, generate a user identifier associated with the user and the digital promotion and communicate the user identifier to the redemption location for redemption of the digital promotion.

A non-transitory computer readable medium for processing a digital promotion may include computer executable instructions that when executed by a processor cause the processor to perform operations. The operations may include determining a geographic destination of the user based upon a ride-sharing application operated by a mobile wireless communications device associated with a user and generating a digital promotion for redemption at a redemption location associated with the geographic destination and communicate the digital promotion to the mobile wireless communications device. The operations may also include cooperating with the mobile wireless communications device to prompt the user to accept the digital promotion, and upon acceptance, generate a user identifier associated with the user and the digital promotion and communicate the user identifier to the redemption location for redemption of the digital promotion.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
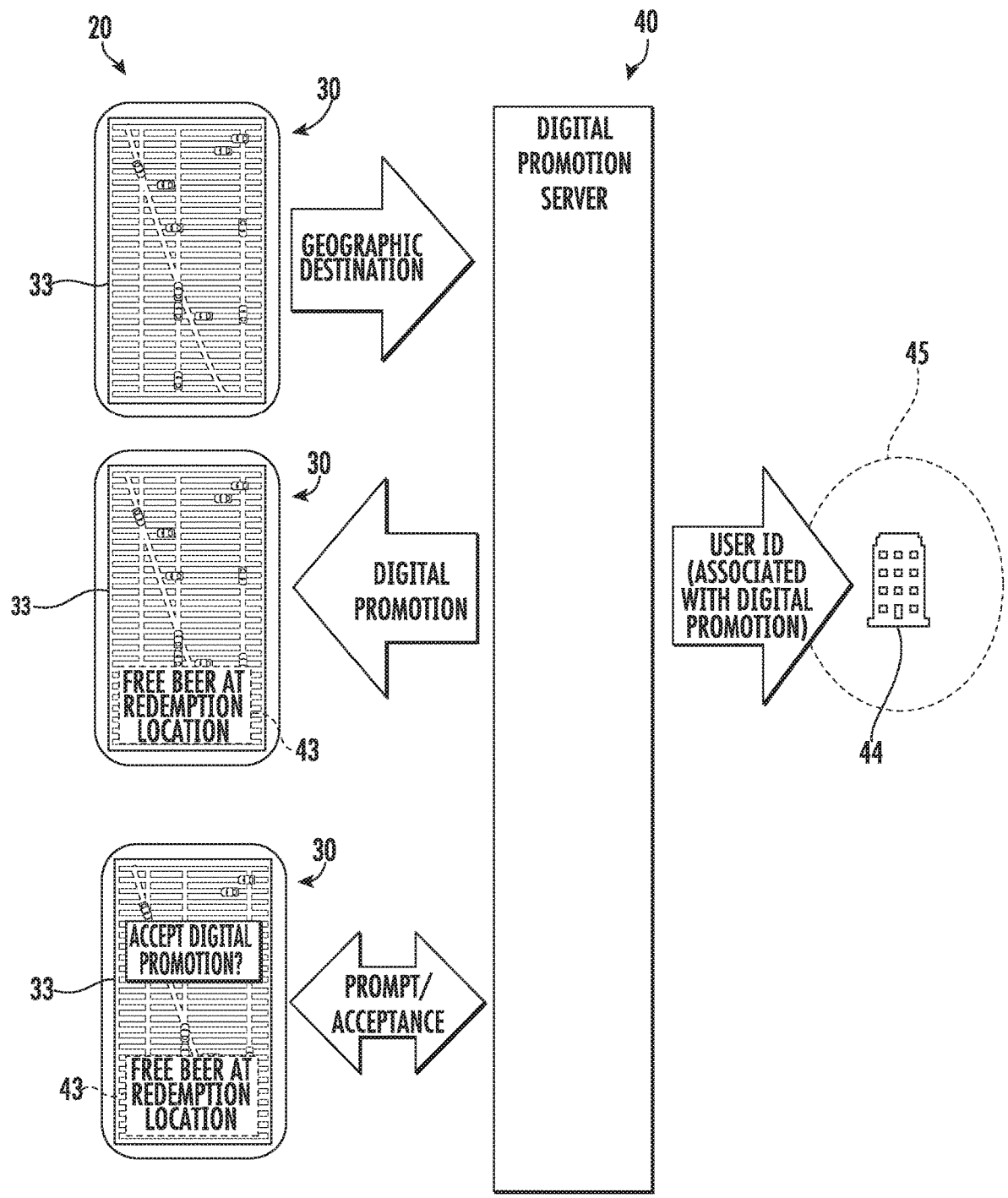
FIG. 1 is a schematic diagram of a system for processing a digital promotion in accordance with an embodiment.
Figure 2:
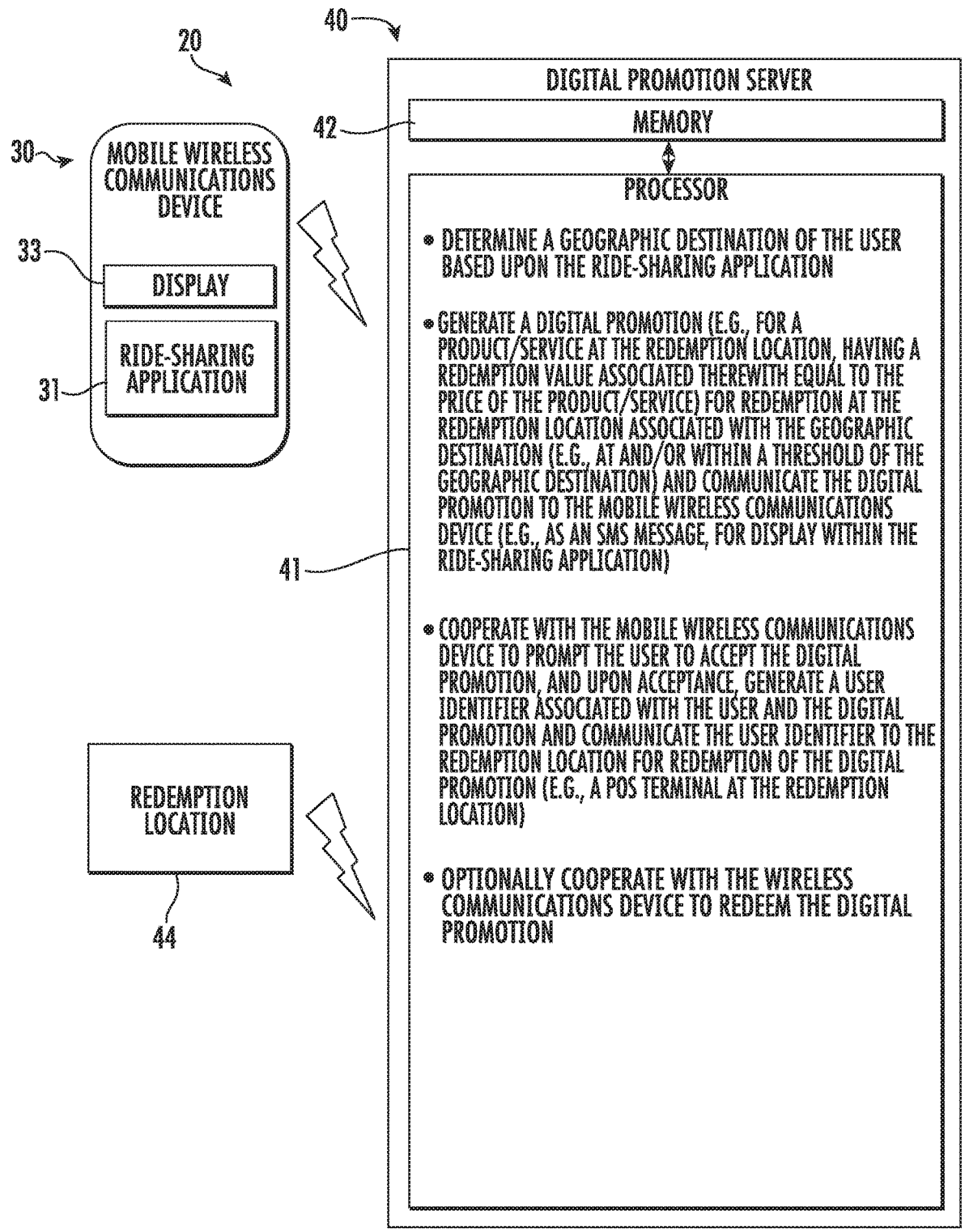
FIG. 2 is a schematic block diagram of the system of FIG. 1

Referring initially to FIGS. 1-2, a system for processing a digital promotion 20 includes a mobile wireless communications device 30 associated with a user. The mobile wireless communications device 30 is illustratively in the form of a smartphone and operates a ride-sharing application 31. As will be appreciated by those skilled in the art, a ride-sharing application 31 permits a user to arrange one-time shared rides on demand. A typical ride-sharing application 31 permits the user to request a ride, for example, using their mobile wireless communications device 30. The ride-sharing application 31 connects the user to a driver, who typically drives their private vehicle and operates the ride-sharing application on their respective mobile wireless communications device, based upon respective geographic locations. Payment for the ride is typically handled through the ride-sharing application 31. Information about a requested ride, location and information about a driver or potential driver, and pricing information are displayed on a display 33 of the mobile wireless communications device 30. While the mobile wireless communications device 30 is in the form of a smartphone, the mobile wireless communications device may be another type of mobile wireless communications device, for example, a tablet computer and/or wearable computer.

The system 20 also includes a digital promotion server 40. The digital promotion server 40 includes a processor 41 and a memory 42 cooperating therewith. The digital promotion server 40 cooperates or communicates with the mobile wireless communications device 30 by way of one or more networks, for example, wireless or cellular networks. While operations of the digital promotion sever 40 are described herein, it should be appreciated that the operations of the digital promotion server are performed through cooperation between the processor 41 and the memory 42.

Figure 3:
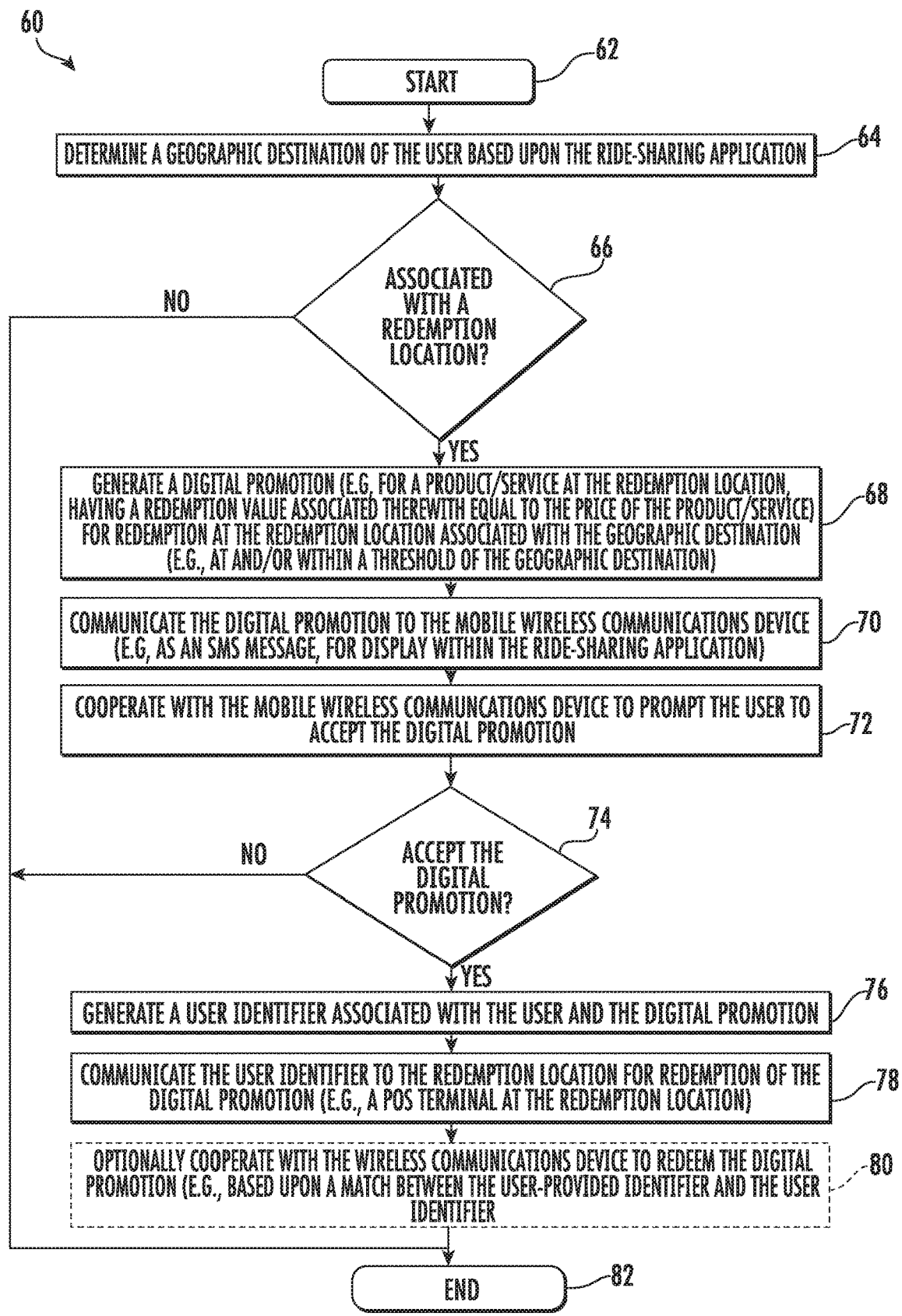
FIG. 3 is a flowchart illustrating operation of the digital promotion server of FIG. 2.

Referring now to the flowchart 60 in FIG. 3, beginning at Block 62, operation of the digital promotion server 40 will now be described. At Block 64, the digital promotion server determines a geographic destination of the user based upon the ride-sharing application. As will be appreciated by those skilled in the art, the ride-sharing application 31 accepts a desired geographic destination 45 of the user by way of input (e.g., spoken and/or written) to the mobile wireless communications device 30. The geographic destination 45 may be a bar, restaurant, or store (e.g., grocery) that sells product and/or services.

At Block 66, the digital promotion server 40 determines whether the geographic destination 45 is associated with a redemption location 44 for a digital promotion 43. For example, the digital promotion server 40 may determine if the user's geographic destination 45 is or is within a threshold distance from a restaurant, bar, or store that has a digital promotion 43 associated therewith (e.g., is participating in a digital promotion campaign). In other words, while the geographic destination 45 may be the same (e.g., in terms of geographic coordinates) as the redemption location 44, the geographic destination may be different than (e.g., nearby, same building, across the street, next door, etc.) the redemption location.

If at Block 66 the geographic destination 45 is associated with a redemption location for a digital promotion 43, the digital promotion server generates a digital promotion for redemption at the redemption location 44 associated with the geographic destination 45 (Block 68) and communicates the digital promotion to the mobile wireless communications device 30 (Block 70). The digital promotion 43 may be displayed on the display 33 of the mobile wireless communications device 30, for example, within the ride-sharing application 31. In some embodiments, the digital promotion 43 may be communicated outside the ride-sharing application 31, for example, as a short-messaging-service (SMS) message.

If at Block 66, the geographic destination 45 is not associated with a redemption location for a digital promotion 43, the operations end at Block 82. The digital promotion 43 may be for a product and/or service available at the redemption location 44. The digital promotion 43 may be in the form of a digital coupon or digital rebate and have a promotional or redemption value associated therewith. The redemption value may be applied toward the purchase price of a product or service at the redemption location. In some embodiments, the redemption value may be equal to the entire purchase price of the product or service, and may include taxes and gratuities.

At Block 72, the digital promotion server 40 cooperates with the mobile wireless communications device 30 to prompt the user to accept the digital promotion 43. To accept the digital promotion 43, the user may provide input to the mobile wireless communications device 30, for example to a touch screen input. Upon acceptance of the digital promotion 43 at Block 74, the digital promotion server 40 generates a user identifier associated with the user and the digital promotion 43 (Block 76) and communicates the user identifier to the redemption location 44 for redemption of the digital promotion 43 (Block 78). If the user does not accept the digital promotion 43, the operations end at Block 82. In some embodiments, the digital promotion 43 may be removed from the display 33 if the user does not accept the digital promotion, for example, by expressly denying the digital promotion or failing to accept the digital promotion within a threshold time period.

Figure 4:
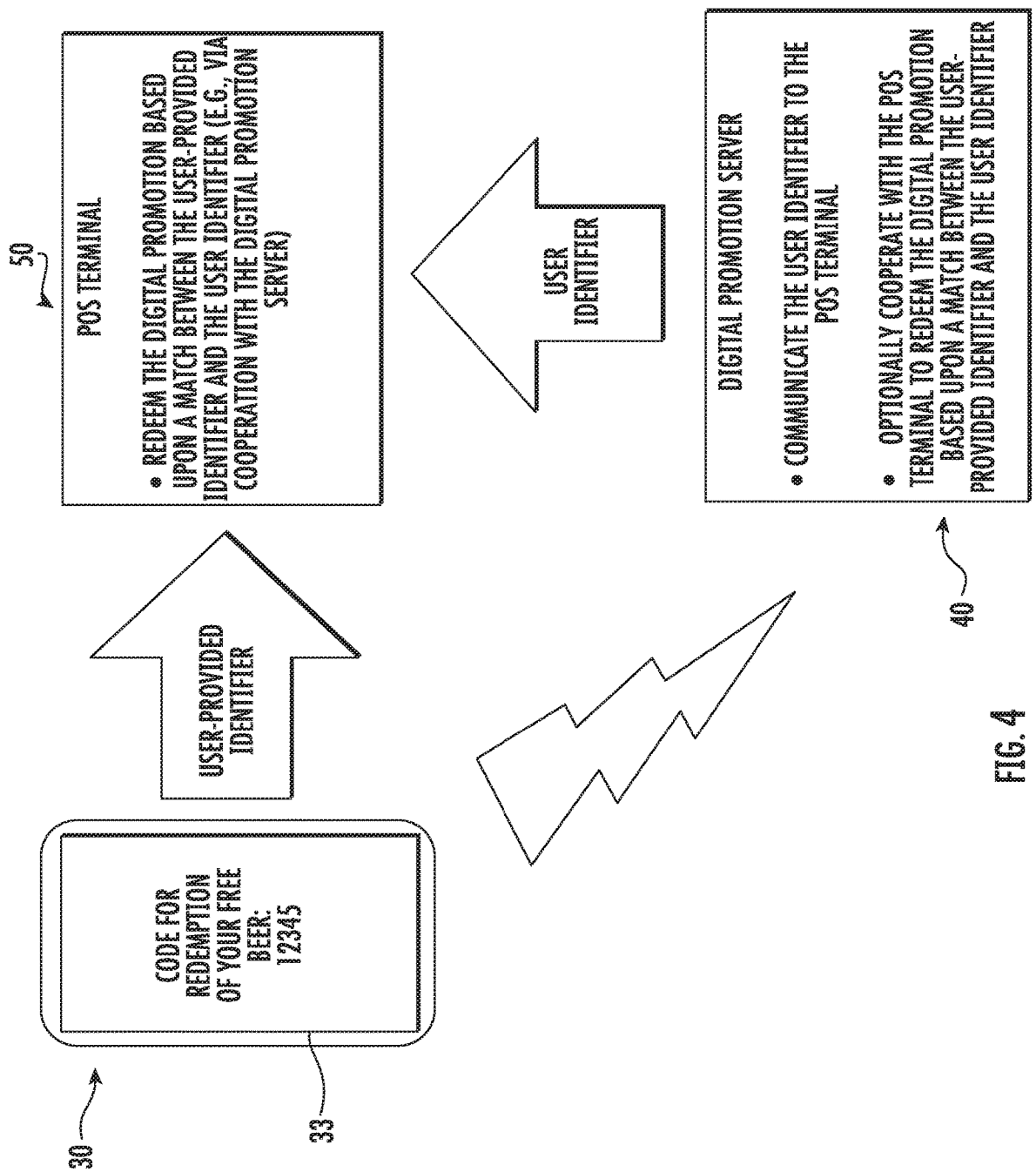
FIG. 4 is another schematic diagram of a system for processing a digital promotion in accordance with an embodiment.

More particularly, referring additionally to FIG. 4 and with respect to communicating the user identifier to the redemption location 44, a point-of-sale (POS) terminal 50 may be at the redemption location. The digital promotion server 40 may communicate the user identifier to the POS terminal 50 for redemption of the digital promotion 43 (Block 78).

Upon redemption, for example, the POS terminal 50 may obtain a user-provided identifier, for example, a multi-digit code, a passphrase, or other data, that identifies the user. For example, the mobile wireless communications device 30 may wirelessly communicate the user-provided identifier or code to the POS terminal 50. Alternatively, the digital promotion 43 may be saved to a digital wallet on the mobile wireless communications device 30 so that upon redemption, the digital promotion is displayed on the display 33 along with the user-provided identifier (e.g., numerical code, QR code, barcode, etc.). The displayed user-provided identifier may be manually entered at the POS terminal 50 or scanned (e.g., optically) by the POS terminal to complete the redemption (e.g., apply the redemption value to the products/services being purchased).

At Block 80, the digital promotion server 40 may optionally cooperate with the POS terminal 50 to redeem the digital promotion 43, for example, based upon a match between the user-provided identifier and the user identifier. As will be appreciated by those skilled in the art, while redemption may occur at the POS terminal 50, validation of redemption and payment processing from the digital promotion provider or promotion campaign manager may be processed through the digital promotion server 40. In some embodiments, for example, where payment associated with the digital promotion 43 is made from the promotion campaign to the redemption location 44 upon communication of the user-identifier to the POS terminal 50, cooperation between the POS terminal and the digital promotion server 40 may not occur. Operations end at Block 82.

A method aspect is directed to method of processing a digital promotion 43. The method includes using a processor 41 and an associated memory 42 to determine a geographic destination 45 of the user based upon a ride-sharing application 31 operated by a mobile wireless communications device 30 associated with a user. The method also includes using the processor 41 to generate a digital promotion 43 for redemption at a redemption location 44 associated with the geographic destination 45 and communicate the digital promotion to the mobile wireless communications device 30. The method further includes using the processor 41 to cooperate with the mobile wireless communications device 30 to prompt the user to accept the digital promotion 43, and upon acceptance, generate a user identifier associated with the user and the digital promotion and communicate the user identifier to the redemption location 44 for redemption of the digital promotion.

A non-transitory computer readable medium for processing a digital promotion 43 may include computer executable instructions that when executed by a processor 41 cause the processor to perform operations. The operations include determining a geographic destination 45 of the user based upon a ride-sharing application 31 operated by a mobile wireless communications device 30 associated with a user and generating a digital promotion 43 for redemption at a redemption location 44 associated with the geographic destination and communicate the digital promotion to the mobile wireless communications device. The operations also include cooperating with the mobile wireless communications device 30 to prompt the user to accept the digital promotion 43, and upon acceptance, generate a user identifier associated with the user and the digital promotion and communicate the user identifier to the redemption location 44 for redemption of the digital promotion.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for processing a digital promotion comprising:
   a mobile wireless communications device associated with a user and configured to operate a ride-sharing application and obtain from the user a user-provided identifier input thereto;
   a point-of-sale (POS) terminal at a redemption location and configured to obtain the user-provided identifier; and
   a digital promotion server configured to
      cooperate with the mobile wireless communications device to identify a request for transportation to a brick-and-mortar geographic destination input to the ride-sharing application,
      determine geographic coordinates for the brick-and-mortar geographic destination of the user, and
      determine whether the brick-and-mortar geographic destination matches the redemption location based upon the geographic coordinates, and when so
         generate a digital promotion for redemption at the redemption location and communicate the digital promotion to the mobile wireless communications device for display thereon,
      cooperate with the mobile wireless communications device to prompt the user to accept the digital promotion based upon user input to the mobile wireless communications device, and upon acceptance,
         generate a user identifier associated with the user and the digital promotion,
         communicate the user identifier to the POS terminal at the redemption location, and
         cooperate with the mobile wireless communications device to redeem the digital promotion based upon the user identifier and the user-provided identifier, and
      remove the digital promotion from being displayed based upon one of denial of the digital promotion based upon input to the mobile wireless communications device, and expiration of a time period without acceptance of the digital promotion.

2. The system of claim 1 wherein the digital promotion server is configured to communicate the digital promotion to the mobile wireless communications device for display within the ride-sharing application.

3. The system of claim 1 wherein the digital promotion server is configured to redeem the digital promotion based upon a match between the user-provided identifier and the user identifier.

4. The system of claim 1 wherein the digital promotion is redeemable toward a product/service at the redemption location.

5. The system of claim 4 wherein the digital promotion has a redemption value associated therewith equal to a purchase price of the product/service.

6. The system of claim 1 wherein the digital promotion server is configured to communicate the digital promotion as a short-messaging-service (SMS) message.

7. A digital promotion server for processing a digital promotion comprising:
   a processor and an associated memory, the processor configured to
      cooperate with a mobile wireless communications device associated with a user to identify a request for transportation to a brick-and-mortar geographic destination input to a ride-sharing application operated by the mobile wireless communications device,
      determine geographic coordinates for the brick-and-mortar geographic destination of the user, and
      determine whether the brick-and-mortar geographic destination matches a redemption location based upon the geographic coordinates, and when so
         generate a digital promotion for redemption at a point-of-sale (POS) terminal at the redemption location and communicate the digital promotion to the mobile wireless communications device for display thereon,
      cooperate with the mobile wireless communications device to prompt the user to accept the digital promotion based upon user input to the mobile wireless communications device, and upon acceptance,
         generate a user identifier associated with the user and the digital promotion,
         communicate the user identifier to the POS terminal at the redemption location, and cooperate with the mobile wireless communications device to redeem the digital promotion based upon the user identifier and a user-provided identifier obtained as input to the mobile wireless communications device and obtained by the POS terminal, and remove the digital promotion from being displayed based upon one of denial of the digital promotion based upon input to the mobile wireless communications device, and expiration of a time period without acceptance of the digital promotion.

8. The digital promotion server of claim 7 wherein the processor is configured to communicate the digital promotion to the mobile wireless communications device for display within the ride-sharing application.

9. The digital promotion server of claim 7 wherein the processor is configured to cooperate with the POS terminal to redeem the digital promotion based upon a match between the user-provided identifier obtained at the POS terminal and the user identifier.

10. The digital promotion server of claim 7 wherein the digital promotion is redeemable toward a product/service at the redemption location; and wherein the digital promotion has a redemption value associated therewith equal to a purchase price of the product/service.

11. A method of processing a digital promotion comprising:

using a processor and an associated memory to
cooperate with a mobile wireless communications device associated with a user to identify a request for transportation to a brick-and-mortar geographic destination input to a ride-sharing application operated by the mobile wireless communications device,
determine geographic coordinates for the brick-and-mortar geographic destination of the user, and
determine whether the brick-and-mortar geographic destination matches a redemption location based upon the geographic coordinates, and when so
generate a digital promotion for redemption at a point-of-sale (POS) terminal at the redemption location and communicate the digital promotion to the mobile wireless communications device for display thereon, and
cooperate with the mobile wireless communications device to prompt the user to accept the digital promotion based upon user input to the mobile wireless communications device, and upon acceptance,
generate a user identifier associated with the user and the digital promotion,
communicate the user identifier to the POS terminal at the redemption location, and
cooperate with the mobile wireless communications device to redeem the digital promotion based upon the user identifier and a user-provided identifier obtained as input to the mobile wireless communications device and obtained by the POS terminal, and
remove the digital promotion from being displayed based upon one of denial of the digital promotion based upon input to the mobile wireless communications device, and expiration of a time period without acceptance of the digital promotion.

12. The method of claim 11 wherein using the digital promotion server comprises using the digital promotion server to communicate the digital promotion to the mobile wireless communications device for display within the ride-sharing application.

13. The method of claim 12 wherein using the digital promotion server comprises using the digital promotion server to redeem the digital promotion based upon a match between the user-provided identifier obtained at the POS terminal and the user identifier.

14. A non-transitory computer readable medium for processing a digital promotion, the non-transitory computer readable medium comprising computer executable instructions that when executed by a processor cause the processor to perform operations, the operations comprising:

cooperating with a mobile wireless communications device associated with a user to identify a request for transportation to a brick-and-mortar geographic destination input to a ride-sharing application operated on the mobile wireless communications device;
determining geographic coordinates for the brick-and-mortar geographic destination of the user; and
determining whether the brick-and-mortar geographic destination matches the redemption location based upon the geographic coordinates, and when so
generating a digital promotion for redemption at a point-of-sale (POS) terminal at the redemption location and communicating the digital promotion to the mobile wireless communications device for display thereon, and
cooperating with the mobile wireless communications device to prompt the user to accept the digital promotion based upon user input to the mobile wireless communications device, and upon acceptance,
generate a user identifier associated with the user and the digital promotion,
communicate the user identifier to the POS terminal at the redemption location, and
cooperate with the mobile wireless communications device to redeem the digital promotion based upon the user identifier and a user-provided identifier obtained as input to the mobile wireless communications device and obtained by the POS terminal, and
removing the digital promotion from being displayed based upon one of denial of the digital promotion based upon input to the mobile wireless communications device, and expiration of a time period without acceptance of the digital promotion.

15. The non-transitory computer readable medium of claim 14 wherein the operations comprise communicating the digital promotion to the mobile wireless communications device for display within the ride-sharing application.

16. The non-transitory computer readable medium of claim 14 wherein the operations comprise cooperating with the POS terminal to redeem the digital promotion based upon a match between the user-provided identifier obtained at the POS terminal and the user identifier.

* * * * *